US010142100B2

(12) United States Patent
Block et al.

(10) Patent No.: US 10,142,100 B2
(45) Date of Patent: Nov. 27, 2018

(54) MANAGING USER-CONTROLLED SECURITY KEYS IN CLOUD-BASED SCENARIOS

(71) Applicant: SAP SE, Walldorf (DE)

(72) Inventors: Meinolf Block, Heidelberg (DE);
Christoph Hohner, Mannheim (DE);
Martin Schindewolf, Walldorf (DE);
Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 127 days.

(21) Appl. No.: 15/203,663

(22) Filed: Jul. 6, 2016

(65) Prior Publication Data

US 2018/0013549 A1   Jan. 11, 2018

(51) Int. Cl.
*G06F 21/62* (2013.01)
*H04L 9/30* (2006.01)
*H04L 9/08* (2006.01)
*H04L 9/32* (2006.01)
*G06F 17/30* (2006.01)

(52) U.S. Cl.
CPC ........ *H04L 9/083* (2013.01); *G06F 17/30289* (2013.01); *G06F 21/6218* (2013.01); *G06F 21/6227* (2013.01); *H04L 9/0891* (2013.01); *H04L 9/0894* (2013.01); *H04L 9/3247* (2013.01)

(58) Field of Classification Search
CPC .......... G06F 12/14; G06F 21/78; G06F 21/72; H04L 63/04
See application file for complete search history.

(56) References Cited

U.S. PATENT DOCUMENTS

2010/0172504 A1* 7/2010 Allen .................... H04L 9/0825
380/286

* cited by examiner

*Primary Examiner* — Izunna Okeke
(74) *Attorney, Agent, or Firm* — Mintz Levin Cohn Ferris Glovsky and Popeo, P.C.

(57) ABSTRACT

A system for managing user-controlled security keys in cloud-based scenarios is provided. In some implementations, the system performs operations comprising receiving an information request from a user device via a network, and generating a database query based at least in part upon the information request. The operations can comprise generating a request for a secret key for decrypting encrypted data when the database query requests the encrypted data and/or generating a request for a secret key for encrypting data when the database query requests to encrypt data. The operations can also comprise providing the request to a security key management entity via a network, receiving secret key information from the security key management entity via the network, and using the secret key information to form decrypted data or encrypted data. Related systems, methods, and articles of manufacture are also described.

13 Claims, 4 Drawing Sheets

MANAGING USER-CONTROLLED SECURITY KEYS IN CLOUD-BASED SCENARIOS

TECHNICAL FIELD

The subject matter described herein relates to database management, and more particularly to systems and methods for managing user-controlled security keys in cloud-based scenarios.

BACKGROUND

Software applications and database systems may be hosted and/or accessed through a cloud-based platform. Cloud-based platforms may generally be accessed by users via a network connection, and may not require that users use the physical hardware components which make up the platform themselves. Although cloud-based systems can provide ease-of-access for consumers around the world, security issues can arise when important data is stored in the cloud. Therefore, use of encryption methods may be desirable.

SUMMARY

In one aspect, a method, computer program product and system are provided. The method, computer program product and system execute operations for managing user-controlled security keys in cloud-based scenarios. In one variation, the operations can include generating a request for a secret key for decrypting encrypted data when a database query requests the encrypted data. The operations can further include providing the request to a security key management entity via a network and receiving secret key information from the security key management entity via the network. The operations can further include decrypting the encrypted data using the secret key information to form decrypted data. One or more of the operations can occur at or by a database server.

In some variations the operations can further include receiving an information request from a user device via a network and generating a database query based at least in part upon the information request. The operations can further include generating a second request for a secret key for encrypting unencrypted data when the database query requests to encrypt the unencrypted data, and encrypting the unencrypted data using the secret key information to form second encrypted data when the database query requests to encrypt the unencrypted data. In some aspects, the server may provide online services through a cloud-based architecture, and the query (or an information request) can correspond to a service provided through the cloud-based architecture. In some implementations, the request for the secret key is encrypted with a public key for the server. In some implementations, the secret key information is encrypted with a public key for the database. In various aspects, the operations can further include storing the secret key information in a working memory rather than persisting the secret key information within a long-term storage of the server, and/or removing the secret key information from the working memory after the secret key information is used to decrypt the encrypted data. In some aspects, the security key management entity operates separate from the database server. The security key information may be received in a message signed by the security key management entity with the security key management entity's private key and/or the operations can further include verifying authenticity of the message by checking a signature of the message.

Implementations of the current subject matter can include, but are not limited to, systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Cloud-based systems may be used to store and/or access sensitive, personal, and/or confidential information. For example, a user who is a medical professional may wish to store medical information relating to one or more patients and/or access the medical information to run diagnostics.

Although cloud-based systems may make it easier and/or more convenient for users to store/access important data from virtually anywhere, cloud-based systems may be manipulated by the owners/operators of the systems or targeted by hackers, and/or the information within the systems may be compromised. Although encryption techniques may decrease the chance that compromised information may be decrypted and read by others, security keys used for data encryption may also be stored in the cloud-based system, and may also be compromised in the same manner. Therefore, a user of the cloud-based system may wish to have more control over the security keys, so that it is harder for encrypted data to be decrypted. Thus, the current subject matter is generally directed to systems and methods for managing user-controlled security keys in cloud-based scenarios.

Figure 1:
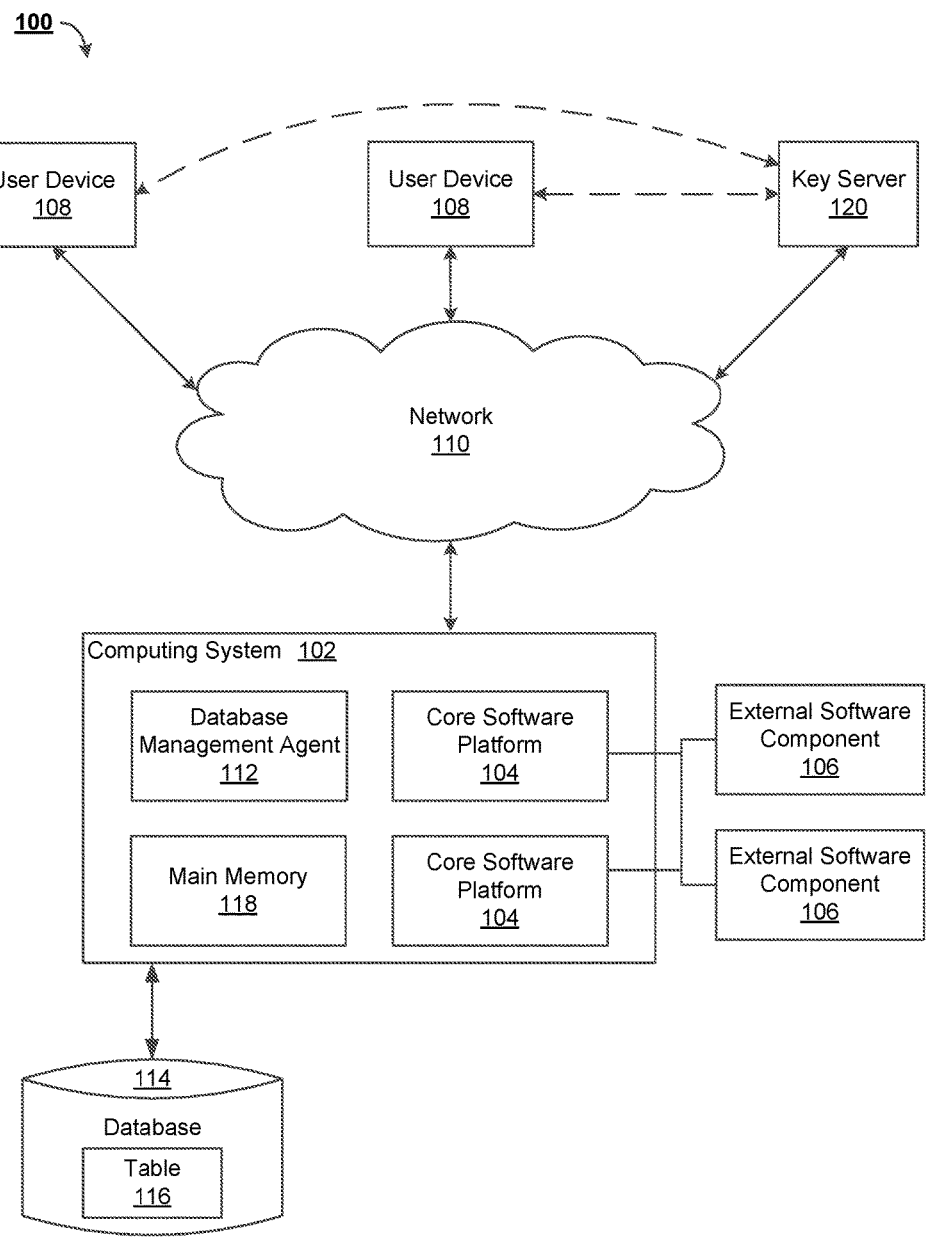
FIG. 1 is a functional block diagram illustrating a cloud-database system in which features consistent with implementations of the current subject matter may be implemented.

FIG. 1 is a diagram of a system 100 that can implement one or more features consistent with the current subject matter. A computing system 102 can include one or more core software platform modules 104 providing one or more features of a high-level programming software system or other software that includes database management features. The computing system can also aggregate or otherwise provide a gateway via which users can access functionality provided by one or more external software components 106. One or more user devices 108 can access the computing system, either via a direct connection, a local terminal, or over a network 110 (e.g. a local area network, a wide area network, a wireless network, the Internet, or the like).

A database management agent 112 or other comparable functionality can access a database 114 that includes at least one table 116, which can in turn include at least one column. The database management agent 112 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

The database management agent 112 or other comparable functionality can be configured to load a database table 116, or other comparable data set, into the main memory 118. The database management agent 112 can be configured to load the information from the database 114 to the main memory 118 in response to receipt of a query instantiated by a user or computer system through one or more user devices 108, external software components 106, core software platforms 104, or the like.

At least a portion of the illustrated system 100 may be implemented as a cloud-based database management system (e.g., not including the user devices 108 and/or the key server 120). In some aspects, a cloud-based database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a cloud-based database management system may be a hardware and/or software system that interacts with a database, users, and/or other software applications for defining, creating, and/or updating data, for receiving, handling, optimizing, and/or executing database queries, and/or for running applications which utilize a database.

In some aspects, data stored in the memory 118 and/or the database 114 may be encrypted. In various implementations, a key server 120 may contain one or more security keys for encrypting data stored in the memory 118, the database 114, and/or otherwise communicated via the network 120. In some aspects, a user (e.g., a user of the user device 108) may manage the keys stored in the key server 120. For example, the user device 108 may access the key server 120 directly (illustrated by the dotted line), the user device 108 may store the key server 120 itself, the user device 108 may access the key server 120 through the network 110, and/or the user device 108 may access the key server 120 over a separate network (e.g., a different network than the network 120 used to access the computing system 102. In some implementations, the key server 120 may be used and/or accessed by more than one user device 108. In other implementations, a key server 120 may only be accessible by one user device 108.

As illustrated, the key server 120 might not be included within the computing system 102 or its associated database 114. Accordingly, the database management agent 112 may be configured to access a key server 120 to obtain information necessary to encrypt and/or decrypt data for storage and/or use with external software components 106, core software platforms 104, and/or the like. For example, during runtime of an application, the database management agent 112 may need to access encrypted data in order to run the application, and may access the key server 120 over the network 110 in order to decrypt the encrypted data for use in the application. In some aspects, an owner/operator of the computing system 102 may not have control over and/or may not have direct access to the key server 120. The keys for decrypting encrypted data stored in the computing system 102 may therefore be kept in a separate location from the encrypted data (e.g., outside of the computing system 102). As a non-limiting example of a benefit of this implementation, security and/or a user's trust in a cloud-based database system may be increased.

Figure 2:
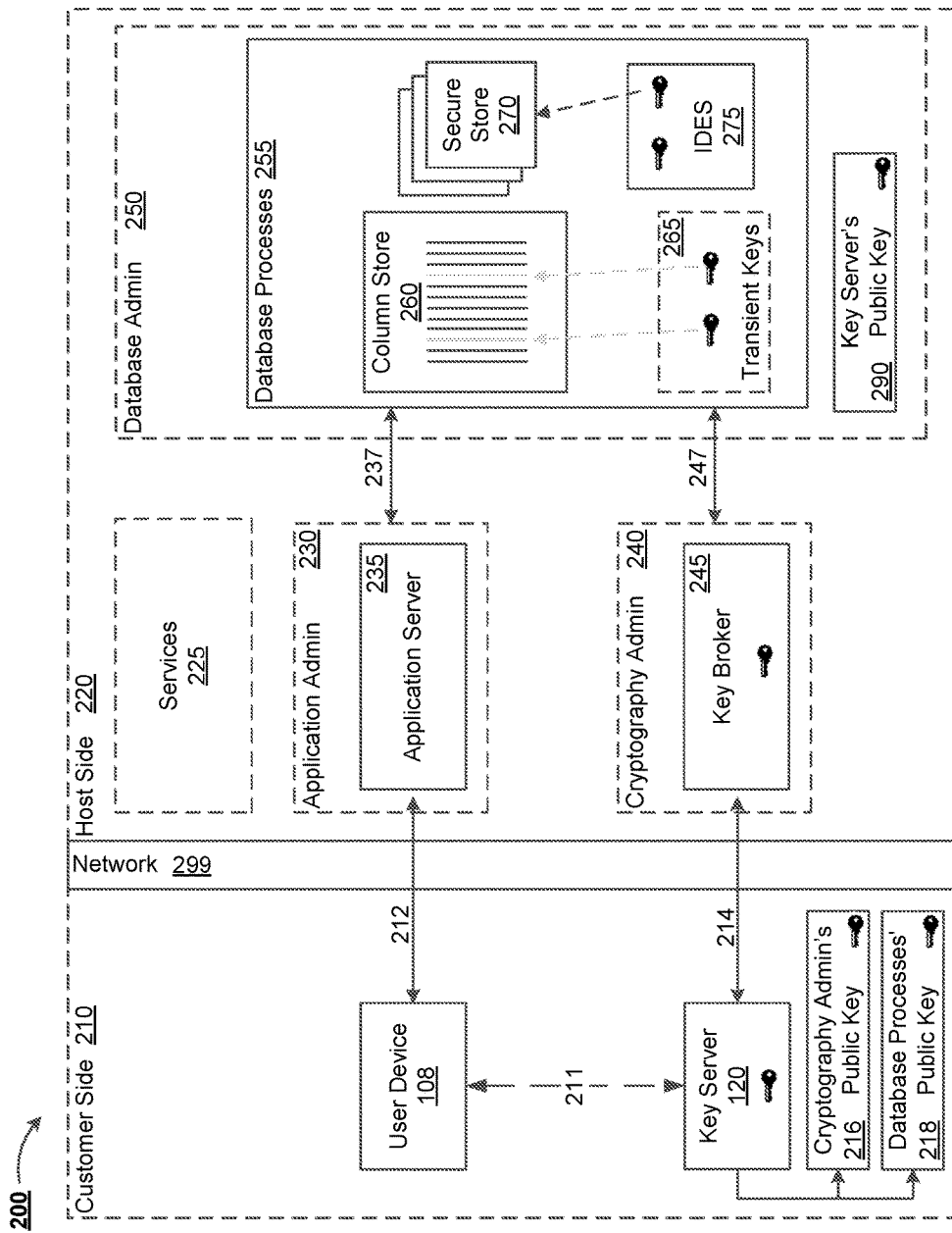
FIG. 2 is a functional block diagram of the database management agent of FIG. 1.

FIG. 2 is an illustration of a system 200 for managing user-controlled security keys in cloud-based scenarios, in accordance with various implementations. The system 200 may be similar to the system 100 of FIG. 1. As illustrated, the system 200 contains a customer side 210 and a host side 220. The customer side 210 may access the host side 220 through a network 299, which may be similar to the network 110 of FIG. 1. Similarly, the host side 220 may access the customer side 210 through the network 299.

The customer side 210 may contain one or more of the user devices 108 of FIG. 1 and one or more key servers 120. In some aspects, a customer may refer to a user who has been provided access to cloud-based services (e.g., services 225 on the host side 220), through a financial transaction or otherwise. The user device 108 may communicate with the key server via communication protocol 211, which may be implemented as communication over a LAN. Through the communication protocol 211, the user device 108 may define one or more security keys for encrypting data. In various implementations, the key server 120 may include algorithms for generating its own security keys, without direction/instruction from the user device 108. As illustrated, the key server 120 may include or otherwise have access to one or more public keys for systems present on the host side 220. Specifically, the key server 120 may store the cryptography administrator's public key 216 and/or the database processes' public key 218. These public keys 216, 218 may be utilized for authentication, as described in more detail below. Where reference is made to data encryption, it will be appreciated that decryption of encrypted data may also be possible using the same or similar techniques. In various implementations, one key server 120 may be used by only one user device 108.

As illustrated, the host side 220 may include one or more services 225. These services 225 may be part of a cloud-based platform, which the user device 108 may access over the network 299. In some aspects, the services 225 may be micro services. In order to access the services 225, the user device 108 may communicate with an application administrator 230 through a communication protocol 212. In some aspects, the communication protocol 212 may be a web-based communication protocol, such as the Hypertext Transfer Protocol (http) or HTTP Secure (https). The application administrator 230 may include an application server 235, which may act as a gateway for access to a database on the host side 220 (e.g., the column store 260). For example, in some aspects, the application server 235 may handle requests for information from a database, and may handle returning the results of the requests. Handling requests and results may include determining when data is needed from a database and/or generating database queries 237. In some aspects, database requests may be implemented according to structured query language (SQL).

As illustrated, the host side 220 may also include a database administrator 250. The database administrator 250 may control access to database processes 255. Database processes 255 may process database queries in order to return requested information properly. Although the database processes 255 are referred to as being plural, various implementations may involve only one database process. Database processes 255 may access information stored in a column store 260. The column store 260 may include various database entries, which may be organized in a column and/or row fashion. In some aspects, at least a portion of the database entries in the column store 260 may be encrypted. In some implementations, the encrypted data may be encrypted through the use of a secret key or private key. These secret keys may be stored in a secure store and file system (SSFS) on the host side 220. However, any keys that are stored alongside the encrypted data are prone to be leaked at the same time as the data. Thus, a strict separation of keys and encrypted data is provided. For example, encrypted data may be stored within the host side 220, and the keys necessary to decrypt data may be stored within the customer side 210. When a key is required to decrypt data stored on the host side 220, it may be requested from the customer side 210 through the methodologies described herein.

As illustrated, the database processes 255 may utilize an IDES 275. The IDES 275 can provide internal capability for the database processes 255 to store sensitive information in an encrypted form. The IDES 275 can create isolated secure store 270 areas by using different encryption keys for each area. The access to these keys may be managed in a way that data can be application-specific and/or user-specific in different use cases. These encryption keys themselves may be encrypted with an IDES root key and stored in the IDES 275. Thus, the IDES 275 needs the root key for its operations, which may be stored externally in an SSFS and/or in the external key server 120.

As illustrated, the database processes 255 may use "transient" keys 265. Transient may refer to the storage method of the keys rather than the keys themselves, which are not persisted in memory (e.g., only temporarily stored within a working memory). The database processes 255 may obtain the transient keys 265 only when they are necessary to decrypt or encrypt data. For example, when the application server 235 needs to use/access data that is encrypted and stored in the column store 260, it may need to be provided with unencrypted results so that it may properly use the data (e.g., to provide a service 255 to the user device 108). In various implementations, the database administrator 250 and/or the database processes 255 may recognize/determine that the application server 235 is requesting encrypted data (e.g., stored within the column store 260). Thereafter, the database administrator 250 and/or the database processes 255 may initiate a procedure for decrypting the data. In some aspects, prior to initiating the procedure, the database administrator 250 and/or the database processes 255 may determine whether the application server 235 and/or the user device 108 is authorized to access the encrypted data. Similarly, the database administrator 250 and/or the database processes 255 may determine that unencrypted data needs to be encrypted before it is stored in the column store 260, and may request a key for encrypting the data.

In order to decrypt or encrypt the data, the database administrator 250 and/or the database processes 255 may request a decryption or encryption key (or keys) from the key server 120. In various implementations, a cryptography administrator 240 on the host side 220 may be used. In some aspects, the cryptography administrator 240 may be a dedicated, Linux-based user. The cryptography administrator 240 may receive a request for a key and/or may provide the response which includes the key through a key access protocol 247. In some aspects, the key access protocol 247 may be a runtime protocol that allows secure transfer of the key to the database processes 255 for encryption and/or decryption of data in the column store 260. In various implementations, the key request provided to the cryptography administrator 240 via the key access protocol 247 may be encrypted by the database administrator 250 and/or the database processes 255 using the key server's public key 290. In some aspects, this encryption step may help to prevent third parties (e.g., not the customer or the host) from decrypting the request, and/or may allow the key server 120 to trust the source of the request.

As illustrated, the cryptography administrator 240 may include a key broker 245. The key broker 245 may act as a proxy between the key server 120 and the database administrator 250. The key broker 245 can be a broker that signs requests for encryption/decryption keys. In some aspects, the key broker 245 may open a local socket which cannot be accessed from outside of the system 200. As necessary, the key broker 245 can request a key from the key server 120, store a response from the key server 120 transiently in memory, and/or can provide the response to the database processes 255 through the key access protocol 247. In some aspects, the response stored transiently at the key broker 245 may include a requested key, encrypted with the database processes' public key 218. In some aspects, communications through the key broker 245 is only initiated through the use of the database processes 255. In some implementations, the key broker 245 may store and/or access files containing hashes of trusted database binaries, which may be used to authenticate requests for keys. The files may be updated by providing a trusted, signed archive containing updated and/or new binaries.

As further illustrated, the cryptography administrator 240 may communicate with the key server 120 according to a key transfer protocol 214. The key transfer protocol 214 can allow the secure transfer of the key and/or a request for the key between the key server 120 and the key broker 245 on demand. In some aspects, the key transfer protocol 214 may be implemented according to http or https. Specifically, the key transfer protocol may use transport layer security (TLS).

Client-authentication and/or server-authentication may be used in either direction. For example, the key broker 245 may sign a request for a key with the cryptography administrator's private key. In some implementations, the signing of the request may only occur after the requestor (e.g., the database processes 255) has been validated. The key broker may validate the requestor through verifying trusted binary hashes. The key server 120, which has access to the cryptographer administrator's public key 216, may therefore be able to authenticate the source of the request. Similarly, the key server 120 may sign a response providing a key to the key broker 245, with a private key of the key server 120, and the key broker 245 in turn verifies the authenticity of the key server 120.

Once the key server 120 receives a request for a key through the key transfer protocol 214, the key server 120 may process the request. For example, the key server 120 may verify the authenticity of the request by checking the signature of the request (e.g., by checking one or both of the database processes' public key 218, and the key broker's public key 290). Once the signature is verified, the key server 120 may decrypt the request, and determine which key should be provided in a response. The key server 120 may then generate the response with the identified key, and encrypt the response using the database processes' public key 218. Additionally or alternatively, the key server 120 may sign the response using the key server's private key. Once generated, the key server 120 may provide the response with the key to the cryptography administrator 240 through the key transfer protocol 214.

As above, in some embodiments, the key requests and the response providing the key may be both encrypted and signed. Specifically, when the key request reaches the key server 120, it may be encrypted with the key server's public key 290 and signed with the cryptography administrator's private key 216. Additionally or alternatively, when the response containing the key reaches the key broker 245, it may be encrypted with the database processes' public key 218 and signed with the key server's private key. The key broker 245 may verify the signature of the response, and upon verification, provide the requested keys to the database processes 255. The database processes 255 may decrypt the response (e.g., using its own private key), and obtain the security keys, which may be temporarily held in working memory (e.g., as transient keys 265) for use in encrypting and/or decrypting data.

In some aspects, the database processes 255 may not have any additional secret that the database administrator 250 cannot obtain as well, as the database processes 255 may run under the privileges of the database administrator 255 operating system user. Although the key broker 245 may not be present in some implementations, its presence can provide additional security by providing a means of authenticating requests/responses sent to/from the database administrator 250, which may thwart man-in-the-middle or replay attacks. For example, the key broker 245 can make sure it only reveals and/or transfers encryption/decryption keys to the correct database processes 255 and not to a malicious database administrator which stole secret information. As such, the key broker 245 may verify that the system 200 runs with additional security mechanisms in place before handing out the keys (e.g., preventing memory dumps, disable debugging, trusted process binaries, and/or the like).

In some embodiments, the key broker 245 may not have access to the database processes private key or the key server's private key, and may therefore be unable to decrypt the requests/responses between the key server 120 and the database administrator 250. If the key broker 245 has access to these private keys, then the security of the system 200 may be compromised. In some aspects, the various public and private keys described may be updated through an update procedure.

Figure 3:
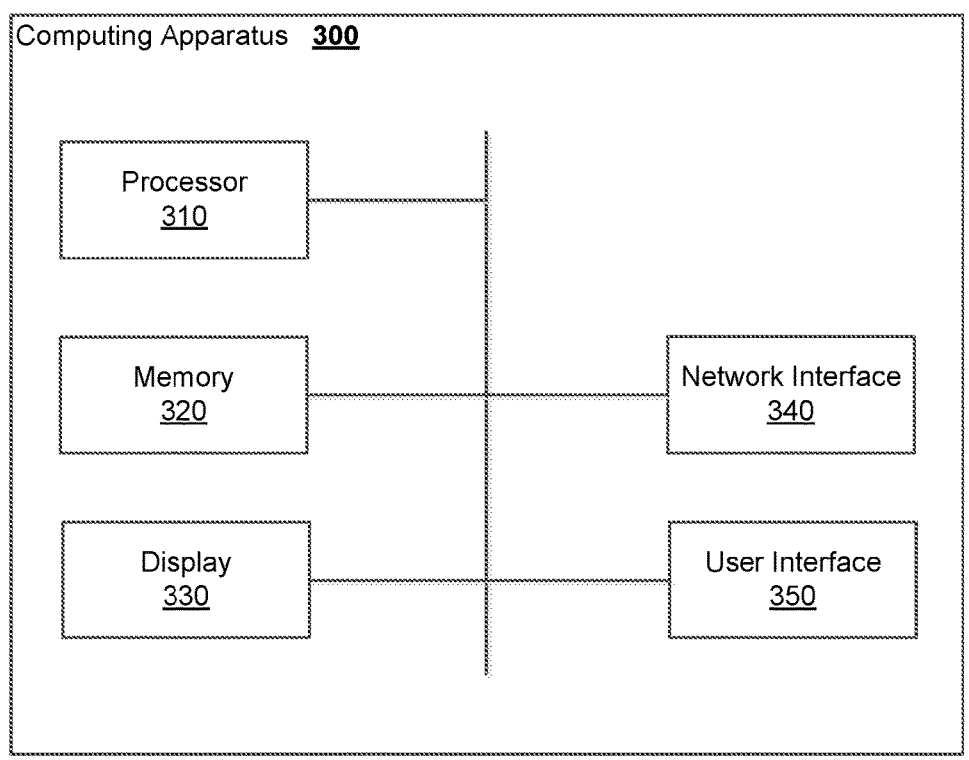
FIG. 3 is an illustration of a system for managing user-controlled security keys in cloud-based scenarios.

FIG. 3 depicts a computing apparatus 300, in accordance with some example implementations. An apparatus consistent with FIG. 3 may implement the user device 108, the key server 120, the computing system 102, the database management agent 112, the application admin 230, the application server 235, the cryptography admin 240, the key broker 245, and/or the database admin 250. Computing apparatus 300 may perform the processes described herein.

Computing apparatus 300 may include one or more processors such as processor 310 to execute instructions that may implement operations consistent with those described herein. Apparatus 300 may include memory 320 to store executable instructions and/or information. Memory 320 may include solid-state memory, solid-state disk drives, magnetic disk drives, or any other information storage device. Memory 320 may provide storage for at least a portion of a database. Apparatus 300 may include a network interface 340 to a wired network or a wireless network, such as the network 110 of FIG. 1 or the network 299 of FIG. 2. Wireless networks may include WiFi, WiMax, and cellular networks (2G/3G/4G/5G), and/or any other wireless network. Apparatus 300 may include one or more user interface, such as user interface 350. The user interface 350 can include hardware or software interfaces, such as a keyboard, mouse, or other interface that may include a touchscreen integrated with a display 330.

Figure 4:
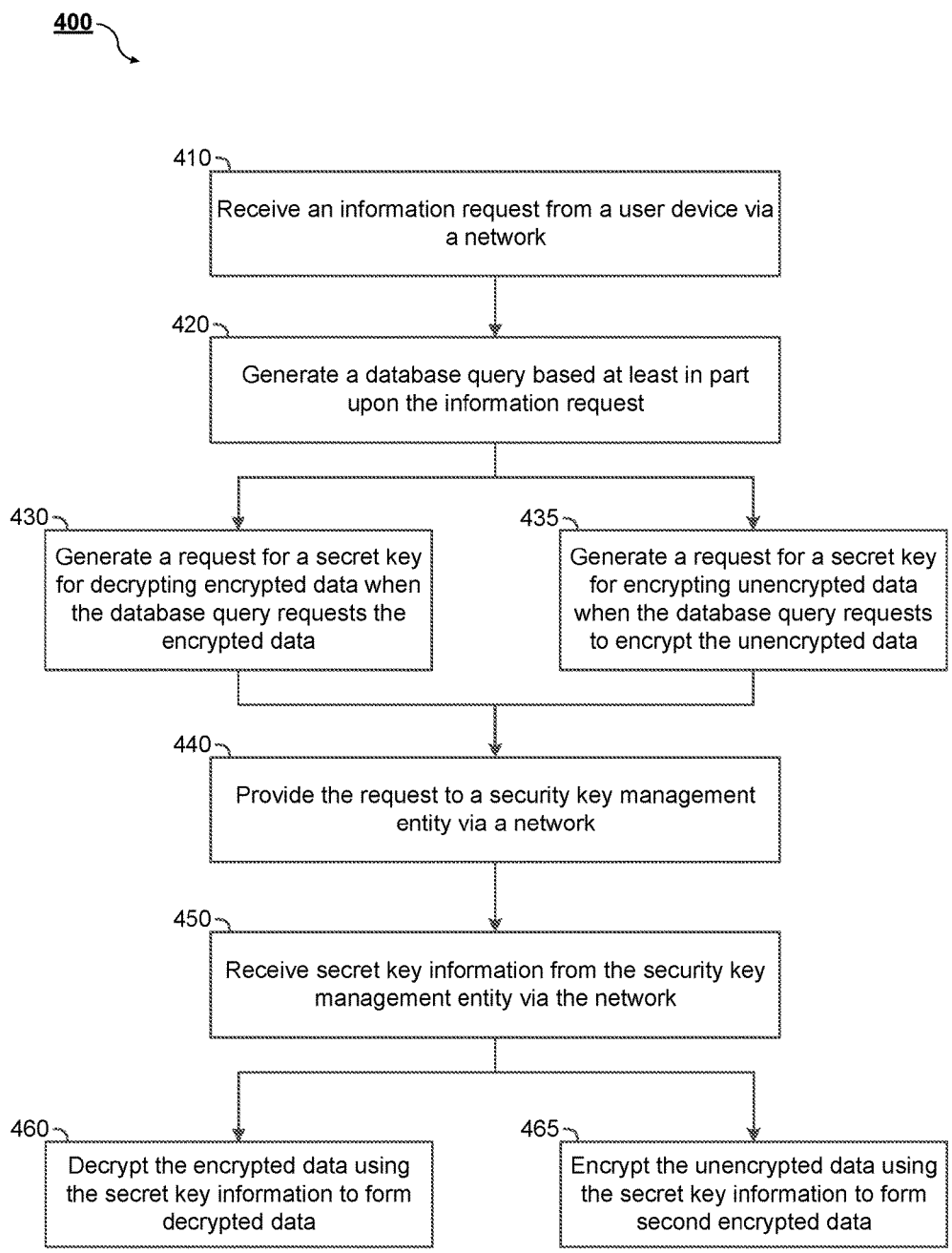
FIG. 4 is a flowchart of a method for managing user-controlled security keys in a cloud-based scenario.

FIG. 4 is a flowchart of a method 400 for managing user-controlled security keys in a cloud-based system having one or more features consistent with the present description. The steps of method 400 illustrated are exemplary only. Although method 400 is illustrated as having a specific operational flow, two or more steps may be combined into a single step, a single step may be performed in one or more steps, one or more of the illustrated steps may not be present in various implementations, and/or additional steps not illustrated may be part of the method 400. In various embodiments, the method 400 may be performed by one or more of a database server, the apparatus 300, the application admin 230, the application server 235, the cryptography admin 240, the key broker 245, and/or the database admin 250. In some aspects, the apparatus 300 may be regarded as a server.

At operational block 410, the apparatus 300, for example, receives an information request from a user device via a network. The user device may be similar to the user device 108 described herein. In some aspects, the apparatus 300 provides online services through a cloud-based architecture, and/or the information request corresponds to a service provided through the cloud-based architecture.

At operational block 420, the apparatus 300, for example, generates a database query based at least in part upon the information request.

At operational block 430, the apparatus 300, for example, generates a request for a secret key for decrypting encrypted data when the database query requests the encrypted data. Additionally or alternatively, at operational block 435, the apparatus 300, for example, generates a second request for a secret key for encrypting unencrypted data when the database query requests to encrypt the unencrypted data.

At 440, the apparatus 300, for example, provides the request to a security key management entity via a network. In some aspects, the request for the secret key is encrypted with a public key for the security key management entity. In various implementations, the security key management entity operates separate from the apparatus 300. For example, in some aspects, the security key management entity may be similar to the key server 120 described herein.

At 450, the apparatus 300, for example, receives secret key information from the security key management entity via the network. In some aspects, the secret key information is encrypted with a public key for the apparatus 300 (e.g., a database server or one or more processes running thereupon).

At 460, the apparatus 300, for example, decrypts the encrypted data using the secret key information to form decrypted data. In some aspects, the decryption may occur when the database query requests the encrypted data. Additionally or alternatively, at operational block 465, the apparatus 300, for example, encrypts the unencrypted data using the secret key information to form second encrypted data (e.g., stored encrypted data). In some aspects, the encryption may occur when the database query requests to encrypt the unencrypted data.

In some implementations, the security key information is received in a message signed by the security key management entity with the security key management entity's private key, and the apparatus 300, for example, may verify authenticity of the message by checking a signature of the message.

In some implementations, the apparatus 300, for example, may store the secret key information in a working memory rather than persisting the secret key information within a long-term storage of the apparatus 300. Additionally or alternatively, the apparatus 300, for example, may remove the secret key information from the working memory after it is used to decrypt the encrypted data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    at least one hardware data processor; and
    at least one memory storing instructions which, when executed by the at least one data processor, result in operations comprising:
        receiving, at a database server and from a client device, a client request for information;
        generating, in response to the received client request, a database request to obtain the information;

generating, at the database server, a request for a secret key for decrypting encrypted data to obtain encrypted data associated with the information;

encrypting the request with a public key of a security key management entity associated with the client device and signing the request with a private key associated with the database server;

providing, by the database server, the encrypted and signed request to the security key management entity via a network;

receiving, by the database server, secret key information from the security key management entity via the network;

storing, at the database server, the secret key information in a working memory rather than persisting the secret key information within a long term storage of the database server;

decrypting, at the database server, the encrypted data using the secret key information to form decrypted data responsive to the client request for the information; and removing, from the database server, the secret key information from the working memory after the secret key information is used to decrypt the encrypted data.

2. The system of claim 1, wherein the operations further comprise:

generating, at the database server, a second request for a secret key for encrypting unencrypted data when the database query requests to encrypt the unencrypted data; and encrypting, at the database server, the unencrypted data using the secret key information to form second encrypted data when the database query requests to encrypt the unencrypted data.

3. The system of claim 1, wherein the database server provides online services through a cloud-based architecture, and wherein the query corresponds to a service provided through the cloud-based architecture.

4. The system of claim 1, wherein the secret key information is encrypted with a public key for the database server.

5. The system of claim 1, wherein the security key management entity operates separate from the database server.

6. The system of claim 1, wherein the security key information is received in a message signed by the security key management entity with the security key management entity's private key, and wherein the operations further comprise:

verifying, at the database server, authenticity of the message by checking a signature of the message.

7. A method comprising:

receiving, at a database server and from a client device, a client request for information;

generating, in response to the received client request, a database request to obtain the information;

generating, at the database server, a request for a secret key for decrypting encrypted data to obtain encrypted data associated with the information;

encrypting the request with a public key of a security key management entity associated with the client device and signing the request with a private key associated with the database server;

providing, by the database server, the encrypted and signed request to the security key management entity via a network;

receiving, by the database server, secret key information from the security key management entity via the network;

storing, at the database server, the secret key information in a working memory rather than persisting the secret key information within a long term storage of the database server;

decrypting, at the database server, the encrypted data using the secret key information to form decrypted data responsive to the client request for the information; and removing, from the database server, the secret key information from the working memory after the secret key information is used to decrypt the encrypted data.

8. The method of claim 7, further comprising:

generating, at the database server, a second request for a secret key for encrypting unencrypted data when the database query requests to encrypt the unencrypted data; and encrypting, at the database server, the unencrypted data using the secret key information to form second encrypted data when the database query requests to encrypt the unencrypted data.

9. The method of claim 7, wherein the database server provides online services through a cloud-based architecture, and wherein the query corresponds to a service provided through the cloud-based architecture.

10. A non-transitory computer program product storing instructions which, when executed by at least one hardware data processors, result in operations comprising:

receiving, at a database server and from a client device, a client request for information;

generating, in response to the received client request, a database request to obtain the information;

generating, at the database server, a request for a secret key for decrypting encrypted data to obtain encrypted data associated with the information;

encrypting the request with a public key of a security key management entity associated with the client device and signing the request with a private key associated with the database server;

providing, by the database server, the request to a security key management entity via a network;

receiving, by the database server, secret key information from the security key management entity via the network;

storing, at the database server, the secret key information in a working memory rather than persisting the secret key information within a long term storage of the database server;

decrypting, at the database server, the encrypted data using the secret key information to form decrypted data responsive to the client request for the information; and removing, from the database server, the secret key information from the working memory after the secret key information is used to decrypt the encrypted data.

11. The non-transitory computer program product of claim 10, wherein the operations further comprise:

generating, at the database server, a second request for a secret key for encrypting unencrypted data when the database query requests to encrypt the unencrypted data; and encrypting, at the database server, the unencrypted data using the secret key information to form second encrypted data when the database query requests to encrypt the unencrypted data.

12. The non-transitory computer program product of claim 10, wherein the database server provides online services through a cloud-based architecture, and wherein the query corresponds to a service provided through the cloud-based architecture.

13. The non-transitory computer program product of claim 10, wherein the secret key information is encrypted with a public key for the database server.

* * * * *